United States Patent [19]

Cole

[11] Patent Number: 4,650,140

[45] Date of Patent: Mar. 17, 1987

[54] WIND EDGE MOVABLE AIRFOIL HAVING VARIABLE CAMBER

[75] Inventor: James B. Cole, Mercer Island, Wash.

[73] Assignee: The Boeing Company, Seattle, Wash.

[21] Appl. No.: 814,637

[22] Filed: Dec. 30, 1985

[51] Int. Cl.$^4$ ................................................. B64C 3/50
[52] U.S. Cl. ...................................... 244/214; 244/219
[58] Field of Search ............... 244/210, 211, 212, 213, 244/214, 219

[56] References Cited

U.S. PATENT DOCUMENTS

| | | | |
|---|---|---|---|
| 2,343,986 | 3/1944 | Leutholf | 244/214 |
| 3,272,458 | 9/1966 | Bracka | 244/210 |
| 4,040,579 | 8/1977 | McKinney | 244/214 |
| 4,131,253 | 12/1978 | Zapel | 244/219 |
| 4,351,502 | 9/1982 | Statkus | 244/214 |
| 4,399,970 | 8/1983 | Evans | 244/214 |
| 4,585,192 | 4/1986 | Clifford-Jones | 244/214 |

Primary Examiner—Galen Barefoot
Attorney, Agent, or Firm—Hughes & Cassidy

[57] ABSTRACT

A leading edge wing slat having a movable nose portion wherein the nose portion leading edge moves relative to the slat frame in a downward and rearward direction when the slat is extended. This causes an intermediate flexible upper skin panel attached between the nose portion and a rigid rear portion of the slat to have its curvature increased thereby increasing the camber of the upper surface of the slat. During retraction of the slat, the nose portion leading edge moves upward and rearward relative to the slat frame decreasing the curvature of the intermediate flexible upper skin panel. The nose portion includes a cam plate having cam slots which are engaged by rollers rotatably connected to the slat frame. Extension of the slat causes the cam plate as programmed by the cam slots to move the nose portion relative to the slat frame to achieve the desired slat camber.

20 Claims, 9 Drawing Figures

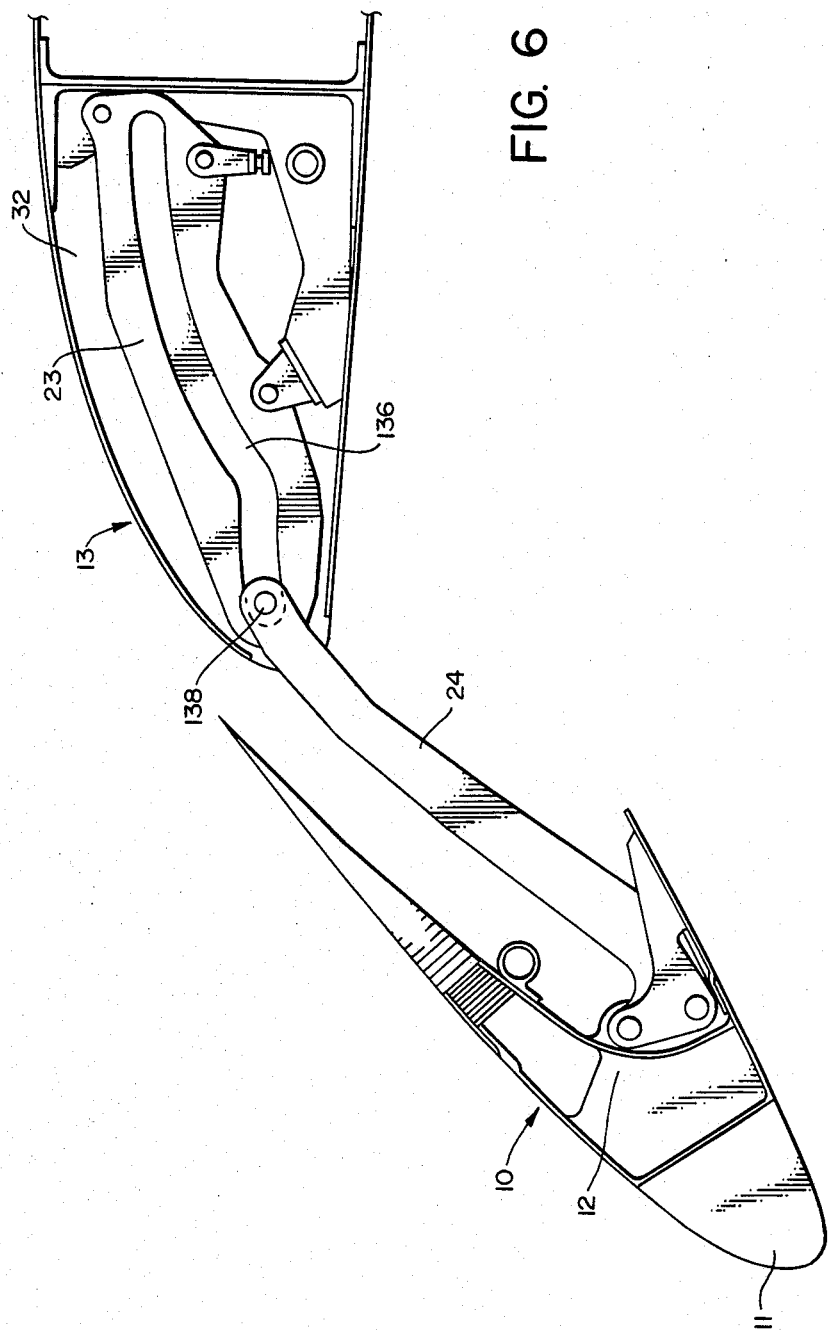

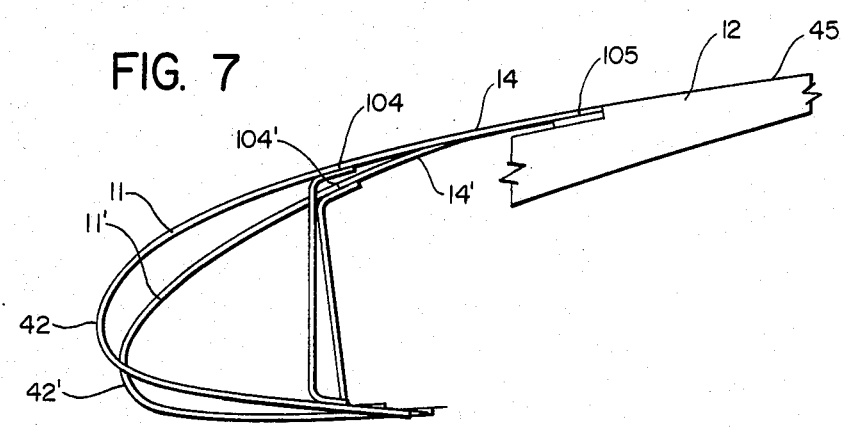
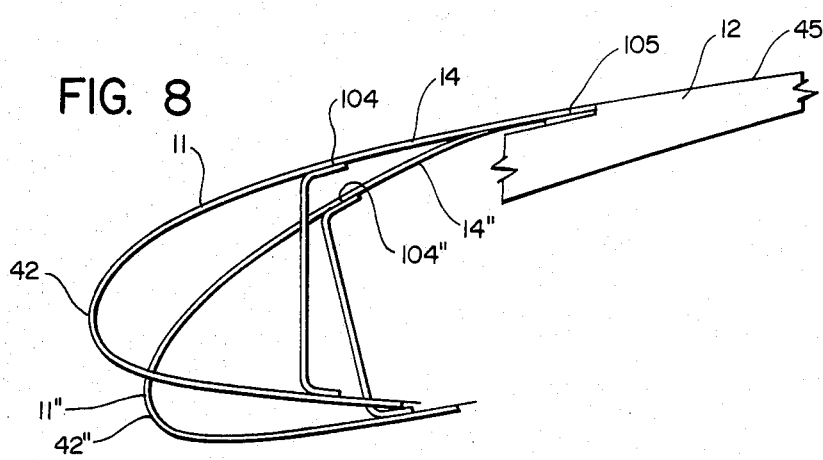

WIND EDGE MOVABLE AIRFOIL HAVING VARIABLE CAMBER

TECHNICAL FIELD

The present invention relates to a movable airfoil, such as a slat or a flap, extending from a leading edge or a trailing edge of an aircraft wing; and more particularly to a movable airfoil which changes camber during retraction and extension of the airfoil from the wing.

BACKGROUND OF THE INVENTION

A common means for modifying the lift characteristics of an aircraft wing for lower speed operation is to use leading and/or trailing edge devices which either pivot or slide outwardly from the leading or trailing edge of the aircraft wing to a deployed position. The contours of these movable airfoils are determined largely by the shape of the wing of which the movable airfoil is a part. In the case where the movable airfoil is a leading edge slat attached to a wing utilized in high speed aircraft, the contour of the slat is relatively flat with a small radius of curvature about the nose making the slat subject to early airflow separation as the angle of attack of the airflow relative to the slat is increased. This airflow separation may be eliminated by increasing the camber of the leading edge slat upper surface thereby preventing airflow separation as the slat is deployed to higher angle of attack positions.

An apparatus for varying the camber of a movable slat was described in U.S. Pat. No. 3,272,458 by Bracka wherein a variable camber leading edge device, having a movable nose portion which is rotated when the device is extended, imparts to the upper surface of the device a curved configuration. A first track slidably mounted to the wing drives the device between the extended and retracted positions, and a second camming track, together with linkage means, rotates the leading edge device to achieve the desired cambered surface.

It is difficult to achieve an aerodynamically desirable cambering program throughout the extension and retraction of a separate flap or slat which moves relative to the fixed portion of a wing because of the large number of interconnected linkage members that must be moved to produce a precisely coordinated movement while overcoming the interference, containment and load problems associated with such a mechanism. Precision is necessary in order to achieve pure bending of the airfoil surfaces rather than a buckling effect which results in uneven airfoil surfaces which are disruptive to the flow of air across the airfoil, and to avoid the imposition of large compression loads on the flexible skin portion which can result in fatigue, damage and failure over extended periods of time.

A number of apparatus also have been disclosed for varying the camber of a wing. For example, in U.S. Pat. No. 4,475,702 by Cole, there is disclosed a variable camber leading edge wing device having a movable nose section which is attached to an upper flexible panel extending rearwardly from the nose section, and which is moved by a rotary pinion gear engaged to an arcuate cam track.

U.S. Pat. No. 4,427,168—McKinney, disclosed a variable camber leading edge wing device having a movable nose section which is attached to an upper flexible panel extending rearwardly from the nose section. The nose section is moved by a rotary driven 4-bar linkage having a support link which is interconnected to the 4-bar linkage and to the upper flexible panel at a midpoint thereof to maintain the flexible skin in a controlled constant curvature when the nose section is moved.

Statkus, U.S. Pat. No. 4,351,502 disclosed a variable camber leading/trailing edge wing device having a movable nose section attached to an upper flexible panel extending rearwardly from the nose section. The nose section is moved by two sets of 4-bar linkages, one set of which controls horizontal and vertical displacement of the nose section, and the other set of which controls both the angle of rotation of the nose section as well as the moment applied to the chordwise midpoint of the flexible upper panel to maintain constant controlled curvature of the flexible panel.

In Rowarth, U.S. Pat. No. 4,200,253 a variable camber leading edge wing device is disclosed which is pivotally mounted to a wing at a single pivot point. The wing device includes a flexible upper skin surface which is maintained in a desired curved profile by a pair of double piano hinge link assemblies attached to the flexible upper skin, and to a rearwardly extending portion of the wing leading edge which terminates at the single pivot point.

In U.S. Pat. No. 4,171,787 by Zapel, there is disclosed a variable camber leading edge of an airfoil having a movable nose section attached to rearwardly extending upper and lower flexible panels, and which is moved between extended and retracted positions by a mounting arm attached to a lower portion of the nose section to swing the nose section downwardly and rearwardly. A toggle linkage connected to an upper portion of the nose section shortens the chordal length of the arc of the upper flexible skin to maintain a continuous cambered curve.

In U.S. Pat. No. 4,159,089—Cole, there is disclosed a variable camber leading edge flap which is movable between a retracted position where it is stowed in a bottom underside portion of the wing, and an extended position downwardly and forwardly from the leading edge of the wing where a flexible upper surface of the flap is flexed to define a curved cambered surface.

Zapel, U.S. Pat. No. 4,131,253 disclosed a variable camber wing trailing edge having upper and lower flexible skin surfaces, and having a walking beam which is movable forwardly or rearwardly to cause a locating arm pivotally connected to the beam to pivot downwardly or upwardly causing corresponding movement of the trailing edge section which flexes the upper and lower skinned surfaces to generate a cambered wing trailing edge.

In McKinney, U.S. Pat. No. 4,040,579 there is disclosed a variable camber leading edge airfoil having a nose section attached to an upper flexible skin surface extending rearwardly from the nose section and also having a lower rigid panel pivotally connected to a lower portion of the nose section and to a drive crank arm. An upper arm is connected to the drive crank arm and to an upper portion of the nose section so that rotation of the drive crank causes the nose section to move downwardly and rearwardly flexing the skin portion through a desired continuous curvature. A pair of drive links connected to the lower panel and to the upper skin via a bending beam cause additional flexing of the upper skin to achieve the desired curvature.

U.S. Pat. No. 3,994,452 by Cole disclosed a variable camber leading/trailing edge device including a nose structure having an upper flexible panel extending rearwardly from the nose structure and a rib beam connected to the nose structure and which during downward movement pulls the nose downward to bend the upper flexible panel. A 4-bar linkage attached to the nose structure is rotated downward to obtain the desired curvature of the upper panel.

In U.S. Pat. No. 2,755,039—Davie, Jr., there is disclosed a variable camber leading edge including a movable nose portion which is rotated downwardly from the wing to form an increasingly cambered leading edge and a slotted passageway between the rotated nose section and the wing.

Leutholt, U.S. Pat. No. 2,343,986 disclosed a curved nose having an upper portion rotatably mounted on a track for chordwise movement so that the nose is moved upwardly and forwardly against an elastic skin member to effect a change in the camber of the wing.

In U.S. Pat. No. 2,019,819—Jones, there is disclosed an airfoil having an eccentric nose section and several wing sections telescoped along a chordwise axis, so that when the nose section is rotated to increase the size of the leading edge, the wing section is telescoped to extend the chordwise length of the wing in symmetrical ratio to the increase in size of the leading edge.

A co-pending application was filed in the name of the applicant of the present invention on Oct. 9, 1984, Ser. No. 658,674 entitled "Variable Camber Leading Edge Assembly".

Many of the aforementioned variable camber wing assemblies utilize a complex arrangement of levers, arms and gears in an attempt to achieve precise repositioning of the leading edge portion of the wing in order to achieve the desired wing camber. In addition, these variable camber wing assemblies are concerned primarily with the cambering of a leading or trailing edge portion of a fixed wing, rather than with the variable cambering of a slat and/or flap apparatus which is extended and retracted from a wing.

SUMMARY OF THE INVENTION

The present invention pertains to an airfoil such as a slat or flap which is movable from a leading edge or trailing edge of a wing between extended and retracted positions; and which during extension from the retracted position increases in camber, and which during retraction from the extended position decreases in camber. In a preferred embodiment, the movable airfoil is a leading edge slat having a nose portion which is movably connected to a slat frame so that during extension of the slat, the leading edge of the slat nose portion moves downward and forward relative to the moving slat frame, and so that during retraction, the nose portion leading edge moves upward and rearward relative to the moving slat frame. The upper surface of the slat includes an intermediate flexible skin panel which is attached to the movable nose portion and to the slat frame. During extension of the slat, movement of the nose portion relative to the slat frame increases the curvature of the flexible panel. This increased curvature of the flexible panel in combination with the aforementioned movement of the nose portion increases the camber of the slat.

Movement of the slat nose portion relative to the slat frame when the slat is moved between the extended and retracted positions is controlled from cam paths by means of two cam followers engaged within cam slots. In an exemplary embodiment, the cam slots are attached to the movable nose portion, and the cam followers are operatively connected to the slat frame.

It is therefore an object of the present invention to provide an airfoil assembly having variable camber when moved relative to a wing between extended and retracted positions.

BRIEF DESCRIPTION OF THE DRAWINGS

These and other objects and advantages of the present invention will become more readily apparent upon reading the following detailed description and upon reference to the attached drawings in which:

FIG. 6 is a sectional side view taken along a different spanwise location than in FIGS. 1 through 6, and showing a conventional auxiliary track used in cooperation with the embodiment shown in FIG. 5 for programming counterclockwise movement of the slat during extension and clockwise movement of the slat during retraction;

FIG. 7 is a diagram showing the position of the slat nose portion after it has been programmed for movement to generate a counterclockwise bending moment about a point connecting the trailing edge portion of the slat and an intermediate flexible skin panel; and FIG. 8 is a diagram showing a position of the slat nose portion after it has been programmed for movement in accordance with the present invention to achieve a desired curvature of the intermediate flexible skin panel.

DETAILED DESCRIPTION OF THE INVENTION

Figure 1:
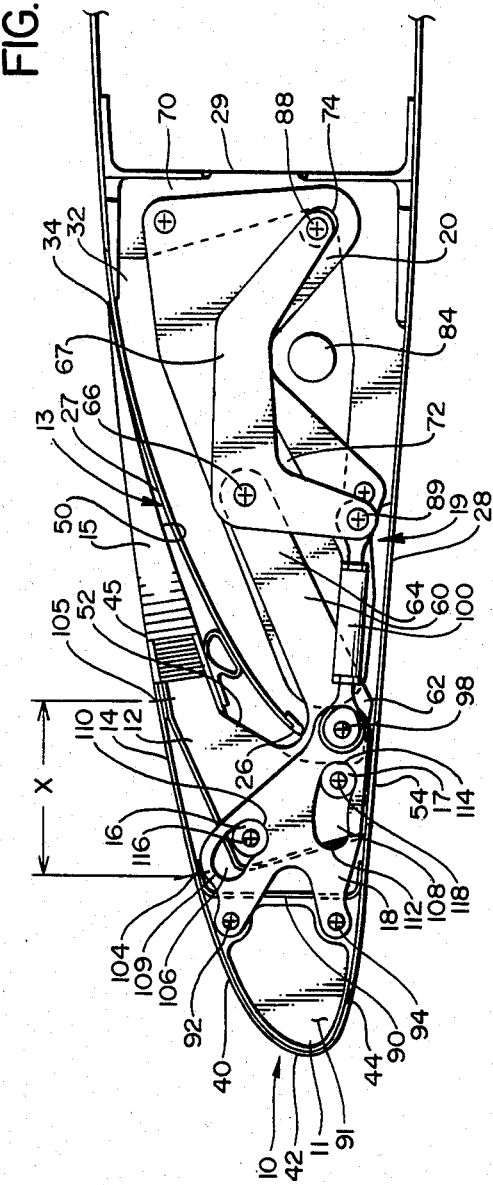
FIG. 1 is a sectional side view of a forward portion of an aircraft wing including a leading edge slat located in a retracted position.

The present invention relates to a movable airfoil which is extended and retracted from a leading edge and/or trailing edge of an aircraft wing, and which increases in camber as it is being extended, and which decreases in camber as it is being retracted. For ease of understanding however, the movable airfoil of the present invention will be described in an exemplary embodiment as a slat which is extended and retracted from the leading edge of an aircraft wing.

The principal elements of the present invention first will be discussed briefly, followed by a more detailed discussion of the invention. The present invention includes a slat indicated at 10 (FIG. 1) which has a nose portion 11 which is movably mounted to a slat frame 12. Nose portion 11 moves during extension and retraction of the slat from a wing indicated at 13 to cause a bending of a flexible skin panel 14 connected between the upper surface of the movable nose portion 11 and a slat trailing edge portion 15 mounted to the slat frame 12. The nose portion 11 is movably connected to the slat frame 12 by means of rollers 16, 17 and a cam plate 18. Cam plate 18 is connected to a linkage assembly generally indicated at 19 which in turn is engaged to a camber programming track 20. During extension of slat 10, cam plate 18 is caused to move in a generally downward and rearward direction past rollers 16, 17 thereby moving nose portion 11 in a counterclockwise direction relative to slat frame 12.

Figure 3:
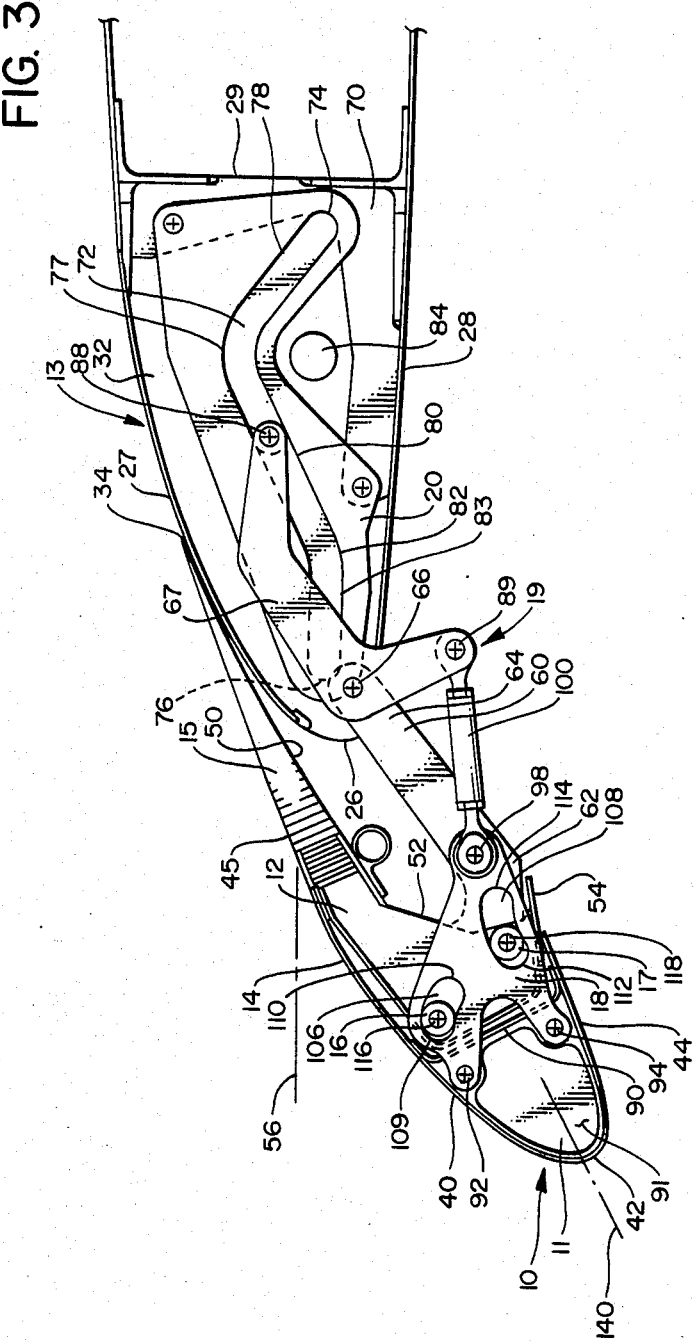
FIG. 3 is a sectional side view taken along the same section as FIG. 1, and showing the slat at a location between the intermediate cruise position of FIG. 2 and the fully extended position.
Figure 4:
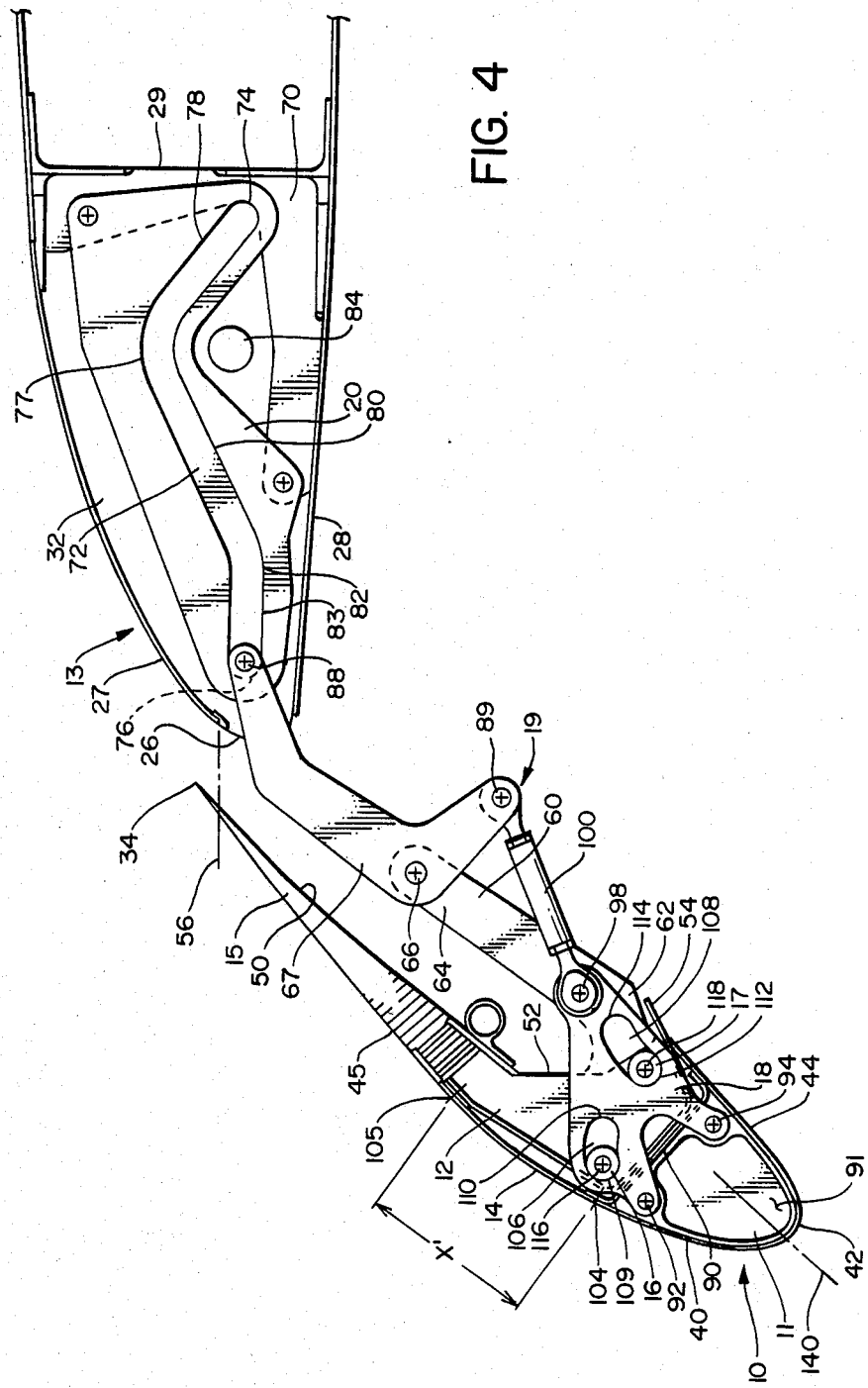
FIG. 4 is a sectional side view taken along the same section as FIG. 1, showing the slat in the fully extended position and having obtained all of its fully cambered configuration.

The slat 11 is moved between the retracted position in FIG. 1 and the fully extended position in FIG. 4 by means of a conventional rotary actuator 21 (FIG. 5) and drive track 22 which are located spanwise from the camber programming track 20 (FIG. 1). Rotation of the slat 10 during extension and retraction is controlled by a slat programming track 23 and programming arm 24 (FIG. 6) located spanwise from the camber programming track 20 (FIG. 1) and the slat drive track 22. As slat 10 is extended by a rotary actuator 21 (FIG. 5) and drive track 22, slat 10 is rotated in a counterclockwise direction, when viewing FIGS. 1-4, relative to the wing 13 by means of the curvature of track 22 and slat programming track 23 (FIG. 6). During the extension of slat 10, nose 11 (FIG. 1) moves in a general counterclockwise direction relative to slat frame 12, and intermediate skin panel 14 curvature increases, thereby increasing the camber of slat 10 as it is extended. Retraction of slat 10 (FIG. 5) by rotary actuator 21 and slat drive track 22 reverses the aforementioned sequence of operation.

Describing the invention in more detail, in FIG. 1 there is shown a forward portion of aircraft wing 13 having a leading edge 26, an upper surface 27, a lower surface 28 and a front spar 29 extending vertically between upper surface 27 and lower surface 28. Front spar 29, upper surface 27 and lower surface 28 define a wing fixed leading edge cavity 32. Located forward of wing leading edge 26 is leading edge slat 10 including support frame 12 which occupies a chordwise vertical plane. Slat frame 12 includes an integral rearward extending trailing edge portion 15 which in turn terminates at a trailing edge 34. Slat 10 includes nose portion 11 which is movably connected to slat frame 12. Nose portion 11 includes an upper rigidly curved skin panel 40 extending primarily upward and then primarily rearward from a leading edge 42, and a lower rigidly curved skin panel 44 extending primarily downward and then primarily rearward from leading edge 42. Rigidly connected between upper skin panel 40 and a rearward upper skin panel 45 of trailing edge portion 15 is intermediate skin panel 14 having flexible properties which allow skin panel 14 to form a bow-like configuration having a center displaced higher than its ends when a bending force is applied to opposite ends of panel 14 by counterclockwise movement of nose 11 relative to slat frame 12. This movement of nose 11 has the effect of causing the curvature of flexible panel 14 to increase.

Slat 10 includes a rear surface 50 (FIG. 1) which extends primarily forward and moderately downward from slat trailing edge 34 to join with a slat rear surface 52 which in turn joins with a bottom surface 54. Slat surfaces 50, 52 define a recessed area for accommodating the forward portion of wing 13 when slat 10 is in the retracted position.

Figure 2:
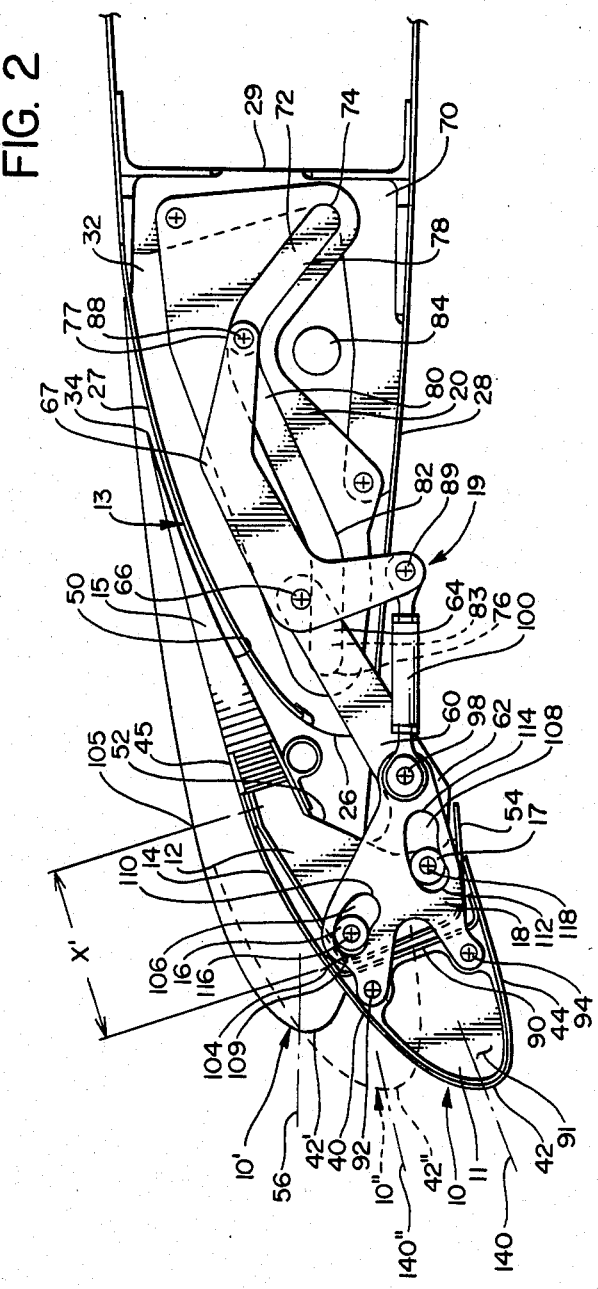
FIG. 2 is a sectional side view taken along the same section as FIG. 1, and showing the slat extended to an intermediate cruise position where the slat has obtained a majority of its fully cambered configuration.

In order to facilitate the explanation of the present invention, it is assumed that the wing has a horizontal reference plane, represented in FIG. 2 by the line 56. With the slat 10 in its retracted position, the reference plane 56 extends from the slat leading edge 42 to the wing trailing edge (not shown for ease of illustration). In the present invention, slat 10 includes rearward extending arm 60 having a forward part 62 which extends rearwardly from slat rear surface 52 when viewing FIG. 2, and an integral rear part 64 which extends upward and rearward from forward part 62 and terminates a pivot connecter 66 located at the distal end of slat arm 60 and having a spanwise pivot axis. Pivot connector 66 is connected to an actuating arm 67 which in turn is engaged to camber programming track 20 in a manner to be described hereinafter.

In order to program the camber of slat 10 during movement between the retracted position shown in FIG. 1 and through various intermediate positions shown in FIGS. 2 and 3, to a fully extended position shown in FIG. 4, camber programming cam track 20 (FIG. 2) extends in a generally fore and aft direction inside wing cavity 32 where it is rigidly connected to a chordwise extending fitting 70 at upper and lower portions of fitting 70. In an exemplary embodiment shown in FIGS. 1 through 4, camber programming track 20 is formed with an elongated cam slot 72 (FIG. 2) having a rearward end 74 located forward of front spar 29 and terminating at a forward end 76 located rearward from wing leading edge 26. Track cam slot 72 extends from rearward end 74 in a generally forward and upward direction to an upper part 77 which defines the uppermost portion of track slot 72 and which together with rear end 74 further defines a first track slot segment 78 which comprises approximately one fourth of the total length of track slot 72. Extending integrally forward and downward from track slot upper part 77 is a second track slot segment 80 which terminates at a lower part 82 such that track segment 80 comprises approximately one half the total length of track slot 72. The second track slot segment 80 is integrally joined to a third track slot segment 83 which extends generally forward and which terminates at forward end 76 so that forward end 76 is generally horizontally aligned with rearward end 74. It should be appreciated that the upwardly extending portion of track slot 72 formed by track slot segments 78, 80 has at least two benefits, namely (i) it allows track 20 to be configured to avoid a drive shaft 84 extending spanwise within cavity 32 below track 20, and (ii) it allows slat 10 to achieve a majority of its fully cambered configuration during the initial portion of the extension of slat 10 providing an aerodynamic advantage which will be described more fully hereinafter.

In order to operatively connect slat 10 to camber programming track 20, actuating arm 67 (i) is pivotally connected to slat support arm 60 at pivot connecter 66, and (ii) is rotatably engaged within track slot 72 by a roller 88 attached to the rearward end of arm 67. The portion of arm 67 located between roller 88 and pivot connecter 66 extends upward and forward and then primarily forward from roller 88, when viewing FIG. 1, to define an upwardly arched arm segment, and then primarily downward from pivot connecter 66 terminating at a pivot connecter 89.

In carrying out the present invention to provide a variable cambered configuration to slat 10 during extension and retraction, nose portion 11 includes cam plate 18 (FIG. 3) extending between nose upper skin panel 40 and nose lower skin panel 44, and occupying a generally vertical chordwise plane. A spanwise extending structural beam or flange 90 extends between, and is rigidly connected to, upper skin panel 40 and lower skin panel 44. It also fastens to the aft end of a nose rib 91 which provides connecting locations 92, 94 located near skin panels 40, 44, respectively, for rigidly connecting cam plate 18 to nose portion 11. Cam plate 18 extends rearward from connecting locations 92, 94 to a rear portion having a pivot connecter 98 with a spanwise extending pivot axis and which is pivotally connected to a linking rod 100 which is selectively adjustable to vary its axial length for slat rigging purposes. Linking rod 100 is connected to pivot connecter 89 of actuating arm 67 so that counterclockwise rotation of actuating arm 67 about pivot connector 66 during extension of slat 10 causes movement of cam plate 18 in a manner to be described hereinafter.

The movable airfoil of the present invention is configured so that as slat 10 moves from the retracted position in FIG. 1 to the fully extended position shown in FIG. 4, the overall camber of the upper surface of slat 10 is increased as the curvature of the intermediate flexible panel 14 increases; and conversely, when slat 10 is retracted from the fully extended position to the retracted position, the camber of the upper surface of slat 10 decreases. This increase in camber in slat 10 is achieved by counterclockwise movement of nose portion 11 relative to slat frame 12 as slat 10 is extended. This counterclockwise movement of nose portion 11 shortens a distance, identified as X', between an attachment point 104 where the rear part of nose upper skin 40 rigidly connects to the forward part of intermediate flexible skin panel 14, and an attachment point 105 where the rear part of intermediate skin panel 14 rigidly connects to the forward part of skin panel 45. The curvature of intermediate skin panel 14 is caused to increase, as shown in FIGS. 2 through 4, by the movement of nose portion 11, which in turn causes distance X (FIG. 1) to decrease to distance X' (FIG. 4).

It can be appreciated that to achieve the precise curved configuration of intermediate skin panel 14 necessary to maintain the desired aerodynamic cambered configuration of slat 10, the movement of nose portion 11 must be precisely controlled throughout the extension and retraction of slat 10 to prevent the buckling of panel 14 and the introduction of damaging compressive loads in panel 14. In order to achieve the proper curved configuration of the flexible skin panel 14, precision machining of cam slots 106 and 108 is necessary to insure that the X dimension (the panel arc chord) is precisely correct for the panel radius of curvature at any given position. In the present invention, precise rotational control of nose portion 11 is obtained through the incorporation of the aforementioned upper and lower arcuate shaped cam slots 106, 108 (FIG. 1) of cam plate 18. When viewing FIG. 1, upper cam slot 106 is formed by an upper end 109, located slightly rearward of cam plate connecter 92, which curves downward and rearward terminating at a lower end 110. Lower cam slot 108 is formed by a forward end 112 located beneath upper cam slot end 110, and a rear end 114 located primarily rearward and somewhat downward of forward end 112. In order to program movement of nose portion 11, upper, lower rollers 16, 17 are rotatably engaged within cam slots 106, 108, respectively. Rollers 16, 17 are rotatably supported on shafts 116, 118, respectively, which in turn are rigidly connected to slat frame 12.

Figure 5:
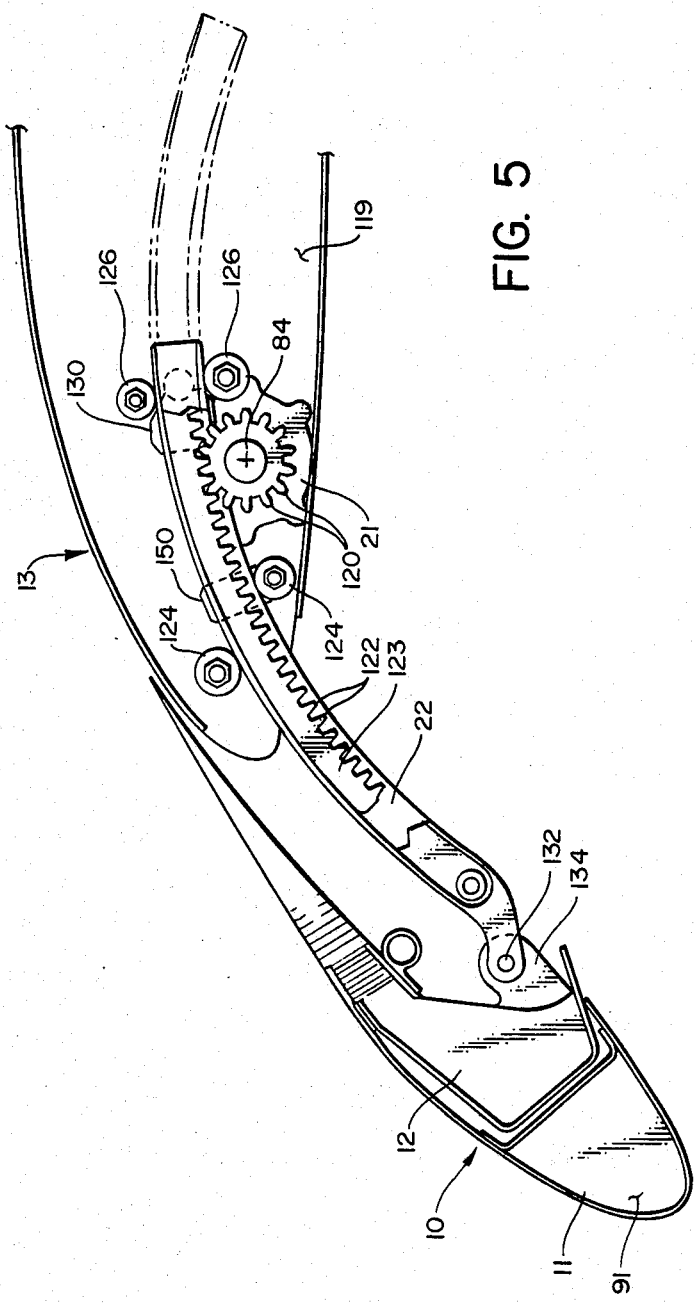
FIG. 5 is a sectional side view taken along a different spanwise section than in FIG. 1, showing exemplary means for extending and retracting the slat including a rotary actuator and a drive track which is pivotally connected to the slat.

Slat 10 is moved between the stowed and fully extended positions by rotary actuator 21, shown in FIG. 5, which is mounted on a fixed leading edge support rib 119 of wing 13. Drive shaft 84 imparts rotational movement to actuator 21 to retract and extend slat 10 by means of drive track 22. Rotary actuator 21 includes a pinion gear which has teeth 120 which radiate about its circumference to mesh with teeth 122 extending downward from a gear rack 123 fastened to drive track 22. Track 22 is supported for chordwise movement in a generally forward and downward direction when extending slat 10, and in a generally upward and rearward direction when retracting slat 10, by a set of opposing forward rollers 124 connected to chordwise support ribs 119 (only one of which is shown) which rotatably engage track 22 at the upper and lower surfaces thereof. A second set of opposing rear rollers 126 located rearward of rotary actuator 21 engage track 22 at its upper and lower surfaces. Side load pads 130 and 150, rigidly connected to chordwise extending ribs 119 of wing 13 at opposite sides of track 22, slidably engage track 22 to prevent its spanwise movement. Track 22 at its forward end includes a pivot connecter 132 having a spanwise pivot axis for pivotally engaging a rearwardly extending fitting 134 of slat frame 12 to allow slat 10 to move about pivot connecter 132 as determined by the programming track 23 (FIG. 6) during extension and retraction of slat 10.

Pivotal movement of slat 10 about pivot connector 132 during retraction and extension is controlled by slat programming track 23 (FIG. 6) which is rigidly connected to wing 13 within wing cavity 32. Slat 10 is connected to programming track 23 by rearwardly extending arm 24 which in turn is rigidly connected to slat frame 12 at a forward end of arm 24. Slat arm 24 is rotatably engaged within a generally chordwise extending cam slot 136 of track 23 by a roller 138.

Referring again to FIGS. 1 through 5, the interrelated functioning of the various elements of the present invention will be described during operation of slat 10 between the stowed and extended positions. As rotary actuator 21 is driven in a counterclockwise direction to extend drive track 22 and slat 10 therewith, camber actuating arm 67 (FIG. 2) is driven along cam track slot 72 in a forward and upward direction causing arm 67 to rotate in a counterclockwise direction about pivot connecter 66. As track roller 88 approaches the cam track slot upper part 77, the counterclockwise rotation of actuating arm 67 imparts to linking rod 100 a general rearward movement. Rearward movement of linking rod 100 causes cam plate 18 to move as programmed by rollers 16, 17 riding in cam slots 106, 108 which in turn moves nose portion 11 in a general counterclockwise direction. More specifically, the upper portion of cam plate 18 is programmed by cam slot 106 to move through an arcuate path primarily downward and moderately rearward past roller 16, while the lower portion of cam plate 18 is programmed by cam slot 108 to move through an arcuate path primarily rearward past lower roller 17. The cooperative movement of cam slots 106, 108 past rollers 16, 17, respectively, results in a series of instantaneous centers of rotation of nose portion leading edge 42 which define a downward and rearward arc-like path.

It should be appreciated that a majority of the angular rotation of slat 10 relative to wing 13 during the initial extension of slat 10 is achieved by the rotation of nose portion 11. For example, if the slat nose 11 remained fixed relative to the slat frame 12 and no camber was added during extension of slat 10 from the retracted position in FIG. 2 and identified as 10', to an intermediate position shown in phantom and identified as 10", the amount of angular rotation of slat 10" would be about 8°. The angular rotation is measured as the angle formed by the intersection of (i) a slat reference plane represented by a line 140" extending rearwardly from slat leading edge 42 and which is located parallel to wing reference plane 56 when slat 10 is in the retracted position, and (ii) the wing reference plane 56. However, due to the programmed rotation of nose portion 11, the angle between slat reference plane 140 of the cambered slat 10 shown in solid lines in FIG. 2, and the wing reference plane 56, is 22°. Therefore, 14° (22°−8°) of angular rotation of slat 10 is due to the rotation of nose portion 11 relative to slat frame 12.

Continuing with a description of the operation of slat 10, as slat actuating arm roller 88 travels along track slot 72 toward track slot lower part 82 (FIG. 3), actuating arm 67 is pivoted further counterclockwise about pivot connecter 66. This causes cam plate 18 and nose portion leading edge 42 therewith to move in a further downward and rearward direction to form an angle between the wing reference plane 56 and slat reference plane 140 of approximately 28°. Further chordwise movement of roller 88 within track slot 72 and rotation of arm 67 about pivot connector 66 causes movement of slat 10 to the fully extended position shown in FIG. 4 so that nose portion leading edge 42 is rotated further downward and rearward and the angle between the wing reference plane 56 and slat reference plane 140 is about 48°. Approximately 16° (48°−32°) of angular rotation of slat 10 is due to movement of nose portion 11 relative to slat frame 12 as a result of the downward and rearward displacement of cam plate 18. It can be appreciated, however, that slat 10 achieves the majority of its cambered configuration during the initial portion of slat extension between the retracted position shown in FIG. 1 and the partially extended position shown in FIG. 2 when actuating arm roller 88 travels to track slot upper part 77, and where cam plate 18 has achieved a majority of its downward and rearward travel relative to cam rollers 16, 17. Therefore, the upward and forward extending cam slot segment 72 results in slat 10 achieving the majority of its fully cambered configuration, i.e. 14° out of a maximum of 16° of camber. This early cambered configuration of slat 10 is particularly advantageous where only partial extension, i.e. minimum drag, of slat 10 is desired, such as during takeoff or when the aircraft is loitering, where additional camber is desired to obtain increased aerodynamic lift.

In order to apply a relatively uniform bending moment to flexible panel 14 which will achieve the desired curvature and which avoids axial compressive forces, the movement of nose portion 11 is programmed so as to achieve (i) counterclockwise rotation about attachment point 105, and (ii) an additional small counterclockwise rotation relative to its spanwise axis at attachment point 104. These movements may be illustrated by comparing the position of the nose portion 11 as it is rotated about point 105 as shown in FIG. 7, (without the aforementioned rotation about its spanwise axis at point 104), with the position of nose portion 11 (FIG. 8) when programmed in accordance with the present invention. Downward movement of nose portion 11 relative to slat frame 12 to the position shown in FIG. 7 where the elements are designated by their respective numerals with a prime (') symbol attached, causes most of the curvature and bending stresses in panel 14' to occur just forward of attachment point 105. This produces an abrupt change in curvature relative to leading edge upper skin panel 45, and does not result in the desired structural or aerodynamic curvature of flexible panel 14'. On the other hand, when movement of nose portion 11 is programmed in accordance with the present invention, nose portion 11 moves to the position shown in FIG. 8 where the elements of the invention are designated by their assigned numerals with a double prime (") attached. In accordance with the present invention, nose portion 11 is programmed for counterclockwise rotation about attachment point 104, when viewing FIG. 8, in combination with the aforementioned counterclockwise rotation of nose portion 11 about attachment point 105. In this manner, the desired curvature of flexible panel 14 is achieved.

Figure 9:
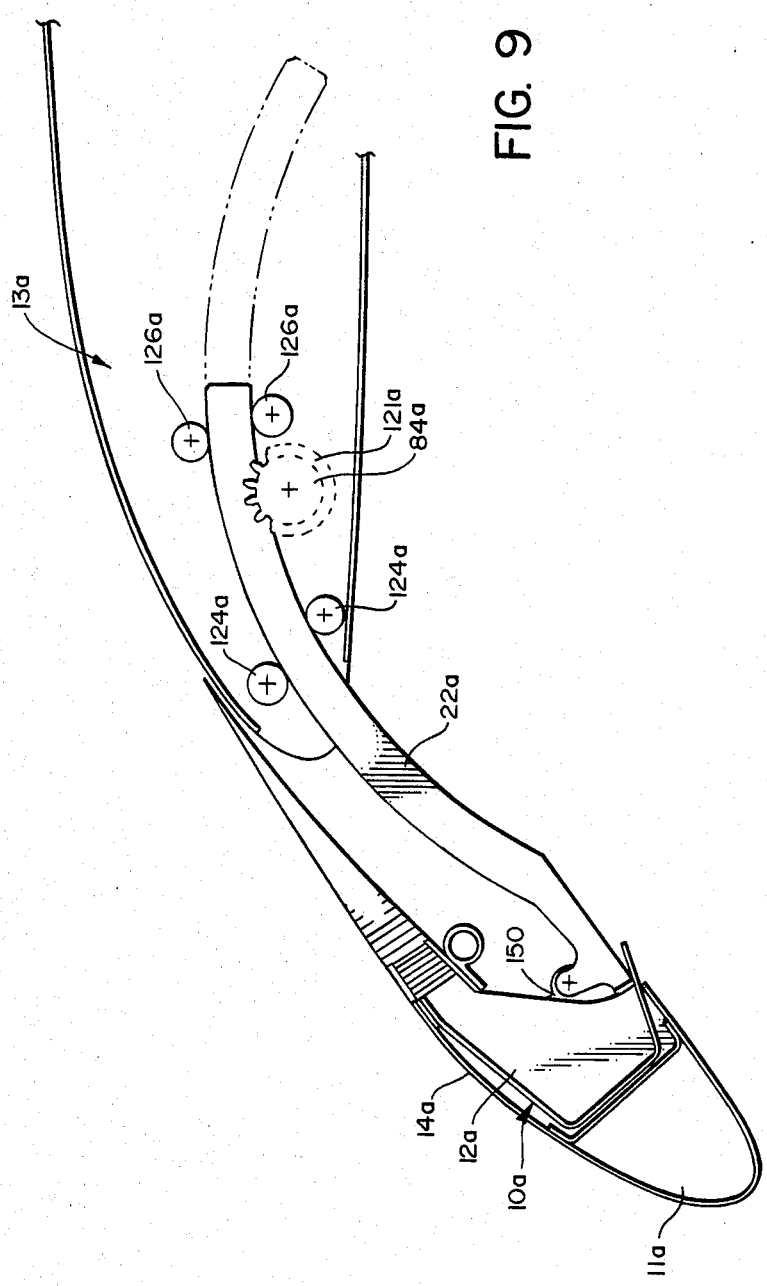
FIG. 9 is a sectional side view taken along a different spanwise section than in FIG. 1, and showing another exemplary means for extending and retracting the slat including a rotary actuator and a track which is rigidly connected to the slat.

Referring to FIG. 9, there is shown an exemplary embodiment of the present invention wherein like elements described with reference to FIGS. 1 through 7 are designated by like numerals with the suffix "a" attached. In the present embodiment there is shown a single pivot slat indicated at 10a which is rigidly connected to drive track 22a so that the position of slat 10a remains fixed relative to the curved drive track 22a during extension and retraction, thus eliminating the need for slat programming track 23 (FIG. 6). During extension, counterclockwise movement of slat 10 is accomplished by downward and forward movement of drive track 22a. Slat 10a includes a movable nose portion 11a and flexible intermediate skin panel 14a as well as a rearwardly extending attachment fitting 150 of slat frame 12a which is fixedly connected to slat track 22a. In the present embodiment the extension and counterclockwise rotation of slat 10a is accomplished by drive track 22a without the use of slat programming track 23 (FIG. 6). However, variable cambering of slat 10 is achieved in the same manner as described previously herein with reference to FIGS. 1 through 4.

The variable camber movable airfoil assembly of the present invention has been described with reference to cam plate 18 having cam slots 106, 108 which engage rollers 16, 17 which in turn are rotatably connected to slat frame 12. However, it is within the scope of the present invention that cam slots 106, 108 be incorporated within slat frame 12 and rollers 16, 17 be connected to cam plate 18 in order to achieve the programmed rotation of nose portion 11 and cambering of slat 10 described previously.

It is also within the scope of the present invention to provide a wing trailing edge variable camber flap (not shown) having a forward portion rigidly secured to a support track and a movable rear portion which is programmed in a manner similar to the programming of nose portion 11 discussed with reference to FIGS. 1-9.

Other embodiments not disclosed herein, but which are encompassed within the spirit and scope of the present invention as disclosed herein are also included as part of the present application.

What is claimed is:

1. A variable camber assembly extending from an edge of a wing, said movable airfoil assembly comprising:
   a. an airfoil member movable between a first position stowed in said wing and a second position extended from said wing, said airfoil member including a nose portion movably connected to a supporting frame of said movable airfoil member for movement relative to said supporting frame;
   b. guide means operatively connected between said movable nose portion and said supporting frame and including a cam track for guiding movement of said movable nose portion between a first upper position where said movable airfoil has a lesser degree of camber, and a second lower position where said nose portion is moved downward from said first upper position in a manner that the camber of said movable airfoil increases when said airfoil member is moved toward said extended position, and wherein the camber of said movable airfoil decreases when said nose portion is moved upward from said second lower position when said airfoil member is moved toward said stowed position; and
   c. actuating means operatively connected between said wing and said guide means for moving said nose portion along said cam track between said first upper position and said second lower position during movement of said airfoil between said stowed and extended positions.

2. The movable airfoil assembly as set forth in claim 1 wherein said guide means includes an upper cam track extending in a downward and rearward direction, and a lower cam track extending in a downward and rearward direction, said upper and lower cam tracks cooperatively guiding said nose portion between said upper and lower positions.

3. The movable airfoil assembly as set forth in claim 2 wherein said airfoil member includes
   a. a trailing edge portion engaged to said supporting structure; and
   b. an upper flexible skin panel extending between said movable nose portion and said trailing edge portion so that movement of said nose portion along said cam track from said upper position to said lower position causes said skin panel to bend in a manner to increase the camber of said airfoil member, and so that movement of said nose portion along said cam track from said lower position to said upper position causes said skin panel to bend in a manner to decrease the camber of said airfoil member.

4. The movable airfoil assembly as set forth in claim 3 wherein:
   a. said upper skin panel includes a forward end where said skin panel is engaged to said nose portion, and a rearward end where said skin panel is engaged to said trailing edge portion; and
   b. said upper cam track extends primarily downward and moderately rearward, and said lower cam track extends primarily rearward and moderately downward, so that said upper and lower cam tracks cooperatively guide said nose portion (i) downward and rearward from said upper position to said lower position in a manner that a bending moment is applied to said flexible panel to cause said flexible panel to form a curve-like configuration, thereby increasing the camber of said airfoil, and (ii) upward and forward from said lower position to said upper position in a manner that the curvature of said skin panel is decreased.

5. The movable airfoil assembly as set forth in claim 2 wherein:
   a. said actuating means are operatively connected to said wing in a manner to permit generally chordwise movement of said actuating means during movement of said airfoil member between said stowed and said extended positions; and
   b. said actuating means are operatively connected to said guide means in a manner to cause said nose portion to move along said upper and lower cam tracks between said upper and lower positions when said movable airfoil moves between said stowed and extended positions.

6. The movable airfoil assembly as set forth in claim 5 wherein said actuating means includes an actuating track (i) which is pivotally connected to said supporting frame at a first location of said actuating track, and (ii) which is operatively connected to said nose portion at a second location of said actuating track, so that chordwise movement of said actuating means causes rotation of said actuating track about said first location to move said nose portion relative to said supporting frame between said upper and lower positions.

7. The movable airfoil assembly as set forth in claim 1 wherein said guide means includes a cam member constrained to move along said cam track, (i) in a downward and rearward direction when said movable airfoil is moved toward said extended position in order to cause movement of said movable nose portion from said upper position to said lower position, and (ii) in an upward and rearward direction when said movable airfoil is moved toward said stowed position in order to cause movement of said nose portion from said lower position to said upper position.

8. The movable airfoil assembly as set forth in claim 7 wherein said airfoil member includes:
   a. a trailing edge portion engaged to said supporting structure;
   b. and an upper flexible skin panel extending between said movable nose portion and said trailing edge portion so that movement of said nose portion from said upper position to said lower position causes said skin panel to bend in a manner to increase the camber of said airfoil member, and so that movement of said nose portion from said lower position to said upper position causes said skin panel to bend in a manner to decrease the camber of said airfoil member.

9. The movable airfoil assembly as set forth in claim 8 wherein:
   a. said actuating means are operatively connected to said wing in a manner to permit generally chordwise movement of said actuating means during movement of said airfoil member between said stowed and extended positions; and
   b. said actuating means are operatively connected to said cam member in a manner to cause said cam member to move along said cam track when said movable airfoil moves between said stowed and extended positions.

10. The movable airfoil assembly as set forth in claim 2 wherein said cam track has an arcuate configuration for guiding said nose portion between said upper position and said lower position.

11. The movable airfoil assembly as set forth in claim 7 wherein:

a. said cam track forms a part of said nose portion; and
b. said cam member is operatively connected to said supporting frame and engaged to said cam track to guide said nose portion between said upper position and said lower position.

12. The movable airfoil assembly as set forth in claim 11 wherein:
a. said nose portion includes (i) an upper skin surface, (ii) a lower skin surface, (iii) a nose rib rigidly connected between said upper and lower skin surfaces, and (iv) a cam plate rigidly connected to said nose rib; and
b. said cam track is formed by a slotted part of said cam plate.

13. The movable airfoil assembly as set forth in claim 7 wherein:
a. said cam track forms a part of said nose portion and includes an upper slotted part of said nose portion extending in a downward and rearward direction, and a lower slotted part of said nose portion extending in a downward and rearward direction;
b. said cam member includes an upper first member engaged within said upper slotted part, and a lower second member engaged within said lower slotted part; and
c. said upper and lower members are movable within said upper and lower slotted parts, respectively, to cooperatively guide said nose portion between said upper and lower positions.

14. The movable airfoil assembly as set forth in claim 13 wherein said nose portion includes a cam plate having said upper and lower slotted parts therein.

15. The movable airfoil assembly as set forth in claim 14 wherein said airfoil member includes,
a. a trailing edge portion engaged to said supporting frame; and
b. an upper flexible skin panel extending between said movable nose portion and said trailing edge portion so that movement of said nose portion from said upper position to said lower position causes said skin panel to bend in a manner to increase the camber of said airfoil member, and so that movement of said nose portion from said lower position to said upper position causes said skin member to bend in a manner to decrease the camber of said airfoil member.

16. The movable airfoil assembly as set forth in claim 15 wherein:
a. said upper skin panel includes a forward end where said skin panel is engaged to said nose portion, and a rearward end where said skin panel is engaged to said trailing edge portion; and
b. said upper slotted part extends primarily downward and moderately rearward, and said lower slotted part extends primarily rearward and moderately downward, so that said upper and lower cam members are cooperatively guided within said upper and lower slotted parts, respectively, during movement of said airfoil to said second position, to guide said nose portion downwardly and rearwardly from said upper position to said lower position in a manner that a bending moment is applied to said flexible panel to cause said flexible panel to form a curve-like configuration, thereby increasing the camber of said airfoil, and (ii) upward and forward from said lower position to said upper position in a manner that the curvature of said skin panel is decreased.

17. The movable airfoil assembly as set forth in claim 16 wherein said actuating means includes an actuating arm which is pivotally connected to said supporting frame at a first location of said actuating arm, and which is operatively connected to said cam plate at a second location of said actuating arm, so that chordwise movement of said actuating means causes rotation of said actuating arm about said first location to move said cam plate relative to said upper and lower members and to move said nose portion between said upper and lower positions.

18. The movable airfoil assembly as set forth in claim 17 wherein said actuating arm is engaged to a chordwise extending track of said wing, in a manner to permit said actuating means to move in said chordwise direction, said track having a rear portion which extends in a chordwise direction substantially upward and forward so that forward movement of said actuating arm along said rear portion of said track causes said actuating arm to move about said first location in an amount sufficient to cause said cam plate and said nose portion therewith to achieve a majority of its movement from the upper position to the lower position.

19. The movable airfoil assembly as set forth in claim 10 wherein said airfoil member includes
a. a trailing edge portion engaged to said supporting structure; and
b. an upper flexible skin panel extending between said movable nose portion and said trailing edge portion so that movement of said nose portion from said upper position to said lower position causes said skin panel to bend in a manner to increase the camber of said airfoil member, and so that movement of said nose portion from said lower position to said upper position causes said skin panel to bend in a manner to decrease the camber of said airfoil member.

20. The movable airfoil assembly as set forth in claim 19 wherein:
a. said upper skin panel includes a forward end where said skin panel is engaged to said nose portion, and a rearward end where said skin panel is engaged to said trailing edge portion; and
b. said upper slotted part extends primarily downward and moderately rearward, and said lower slotted port extends primarily rearward, so that during movement of said airfoil member to the second position, said upper first member and said lower second member are guided within said upper and lower slotted parts, respectively, to cooperatively guide said nose portion downward and rearward from said upper position to said lower position in a manner that a bending force is applied to said flexible panel to cause said flexible panel to form a curve-like configuration, thereby increasing the camber of said airfoil, and (ii) upward and forward from said lower position to said upper position in a manner that the curvature of said skin panel is decreased.

* * * * *